Figure 1A:
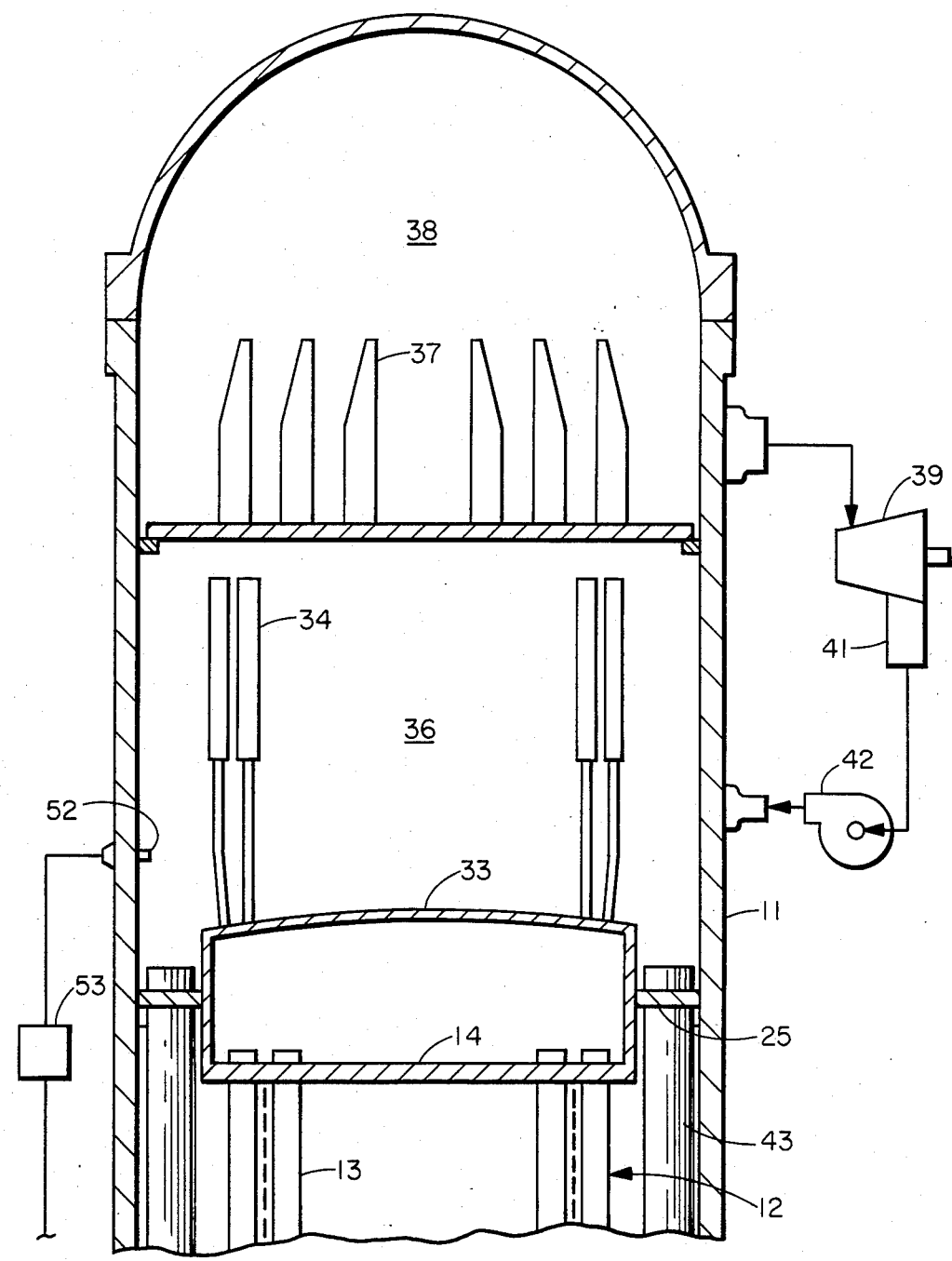

United States Patent [19]

Hobson

[11] Patent Number: 4,696,792

[45] Date of Patent: Sep. 29, 1987

[54] NUCLEAR REACTOR COOLANT RECIRCULATION

[75] Inventor: Robert R. Hobson, San Jose, Calif.

[73] Assignee: General Electric Company, San Jose, Calif.

[21] Appl. No.: 635,730

[22] Filed: Jul. 30, 1984

[51] Int. Cl.⁴ ............................................. G21C 15/06
[52] U.S. Cl. ..................... 376/377; 376/370; 376/371; 376/374; 376/379
[58] Field of Search ............... 376/247, 370, 371, 372, 376/373, 374, 375, 376, 377, 378, 379, 380, 461, 362, 364, 365, 406

[56] References Cited

U.S. PATENT DOCUMENTS

| | | | |
|---|---|---|---|
| 3,042,595 | 7/1962 | Cobb et al. | 376/221 |
| 3,284,307 | 11/1966 | Schortmann | 376/221 |
| 3,338,791 | 8/1967 | Lass et al. | 376/448 |
| 3,366,548 | 1/1968 | O'Neil | 376/372 |
| 3,378,456 | 4/1968 | Roberts | 376/407 |
| 3,389,055 | 6/1968 | Hughes | 376/407 |
| 3,467,578 | 9/1969 | Kornbichler et al. | 376/260 |
| 3,723,247 | 3/1973 | Leine et al. | 376/203 |
| 3,725,199 | 4/1973 | Notari et al. | 376/352 |
| 3,937,653 | 2/1976 | Leheu | 376/362 |
| 4,136,553 | 1/1979 | Jones | 73/52 |
| 4,315,800 | 2/1982 | Yoshimoto et al. | 376/246 |

Primary Examiner—John F. Terapane
Assistant Examiner—Eric Jorgensen
Attorney, Agent, or Firm—Robert R. Schroeder; Raymond G. Simkins

[57] ABSTRACT

Coolant recirculation arrangement for a nuclear reactor including a plurality of vertically oriented tubular conduits arranged in spaced relation between an unshrouded nuclear core and the inner pressure vessel wall for conducting coolant from an upper plenum above the core to a lower plenum below the core.

7 Claims, 4 Drawing Figures

NUCLEAR REACTOR COOLANT RECIRCULATION

BACKGROUND

Nuclear power reactors are well known and are discussed, for example, by M. M. El-Wakil in "Nuclear Power Engineering", McGraw-Hill Book Company, Inc., 1962.

In a known type of nuclear power reactor, for example, as used in the Dresden Nuclear Power Station near Chicago, Ill., the reactor core, housed in a pressure vessel, is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle as shown, for example, in U.S. Pat. No. 3,431,170. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

If the reactor core is operated at a high power density, forced recirculation of the coolant through the core is necessary for adequate heat removal.

A number of coolant recirculation arrangements are known. As shown by J. M. Roberts in U.S. Pat. No. 3,378,456 and by D. E. Hughes in U.S. Pat. No. 3,389,055, it is known to recirculate coolant through the reactor core by the use of jet pumps mounted in an annular space between a shroud surrounding the nuclear core and the inside of the pressure vessel. The jet pumps take coolant from the region above the core and pressurize the coolant in a plenum in the lower portion of the pressure vessel beneath the fuel core from whence it flows upward through the fuel assemblies of the core.

R. O'Neil in U.S. Pat. No. 3,366,548 shows a similar arrangement of jet pumps which are driven by the incoming feedwater. While this purports to eliminate external recirculation piping loops, it creates an interdependence between feedwater and recirculation flow which is impractical where variable recirculation flow rate is used to control reactor power level.

In another known coolant recirculation arrangement, motor driven rotary impellers, mounted within the pressure vessel in alignment with the annular space surrounding the nuclear core provide the forced recirculation of the coolant.

Such arrangements are shown for example by Kornbickler et al in U.S. Pat. No. 3,467,578; by Leime et al in U.S. Pat. No. 3,723,247; and by Yoshimoto et al in U.S. Pat. No. 4,315,800 (the foregoing being incorporated herein by reference). The impeller drive motor may be mounted outside the pressure vessel (as shown in Kornbickler et al FIG. 1a) or the drive motor may be located inside the pressure vessel (as shown in Kornbickler et al FIG. 1b).

Such rotary pump arrangements eliminate external recirculation flow loops while retaining (by drive motor speed control) the capability of variable recirculation flow rate.

In the above-mentioned patents, the nuclear core is surrounded by a shroud which with the inner wall of the pressure vessel forms the downcomer annular space for coolant recirculation flow. In the vessel construction, the shroud supports the lateral core support structures and an array of steam separators above the core (as shown, for example, by the previously mentioned U.S. Pat. No. 3,378,456). Therefore, the shroud is subjected tc relatively high loads, particularly dynamic loads such as seismic loads.

It is an object of the invention to eliminate the core shroud structure in a nuclear reactor.

It is another object to reduce the dynamic loads carried by the nuclear core support structure.

It is another object to reduce the diameter of the pressure vessel for a given size nuclear core.

It is a further object to replace the function of the core shroud as a downcomer for coolant recirculation flow with tubular coolant conducting conduits.

SUMMARY

These and other objects of the invention are achieved by eliminating the core shroud and supporting the core by upper and lower support rings secured to the pressure vessel whereby loads on the core structure are transferred directly to the vessel walls in a manner to reduce dynamic loads.

To replace the function of the core shroud in forming an annular downcomer space for coolant recirculation flow, a plurality of spaced annularly disposed downcomer pipes or conduits are positioned around the array of fuel assemblies forming the nuclear core. These conduits penetrate the upper and lower core support rings whereby they provide coolant recirculation flow passages for coolant from an upper plenum or space above the core to a lower plenum in the bottom of the pressure vessel beneath the core.

In a preferred embodiment of the invention, the coolant in the lower plenum is pressurized for forcing coolant upward throught the fuel assemblies by pumps including rotary impellers inserted into the lower ends of the downcomer conduits, the impellers being removably secured to the upper ends of respective drive shafts, the lower ends of which are connected to and are driven by respective drive motors.

Preferably the downcomer conduits have an inside diameter throughout their length somewhat greater than the outside diameter of the pump impellers. Thus the impellers can be removed and replaced through the conduits, with the conduits conveniently acting as guides for this purpose.

Pressure taps in the downcomer conduits conveniently can provide measurement of coolant recirculation flow rate.

DRAWING

Figure 1B:
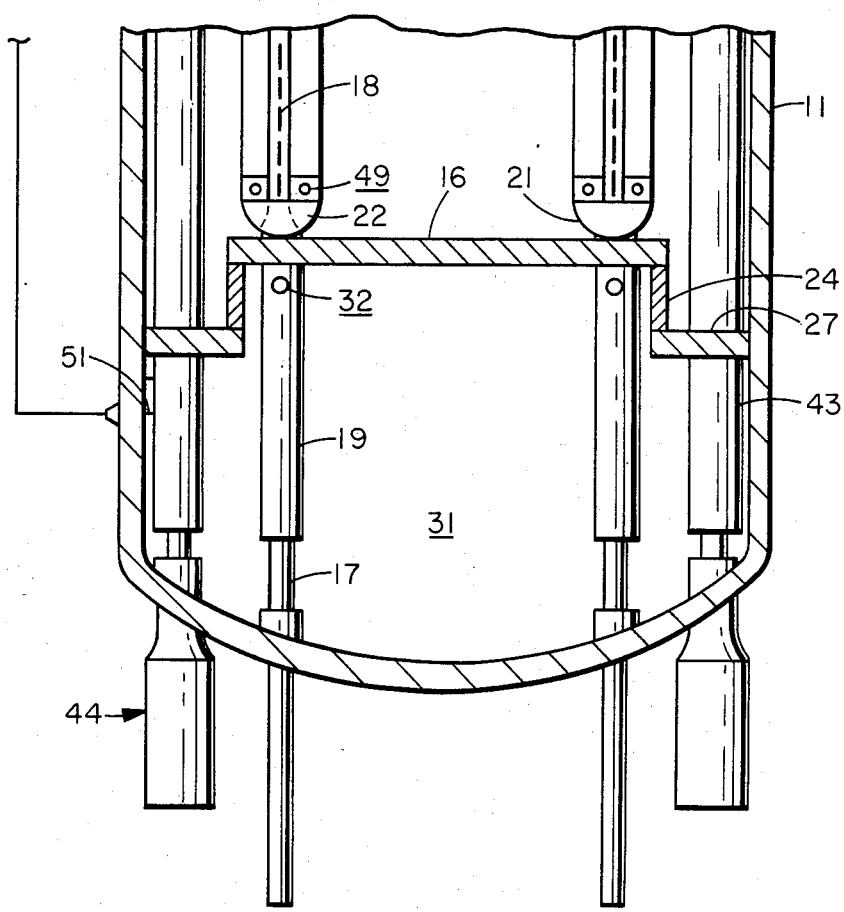
Figure 2:
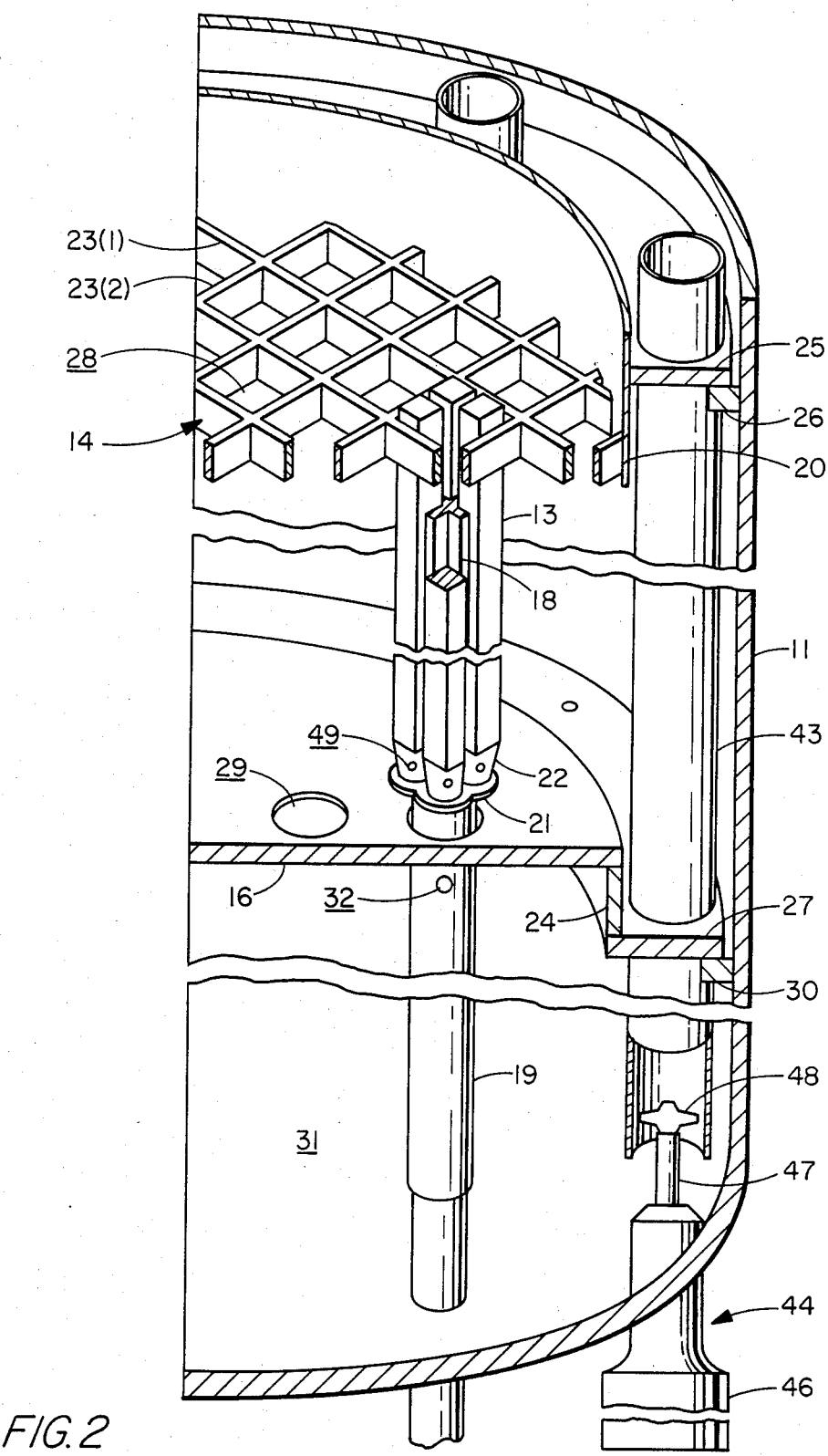
Figure 3:
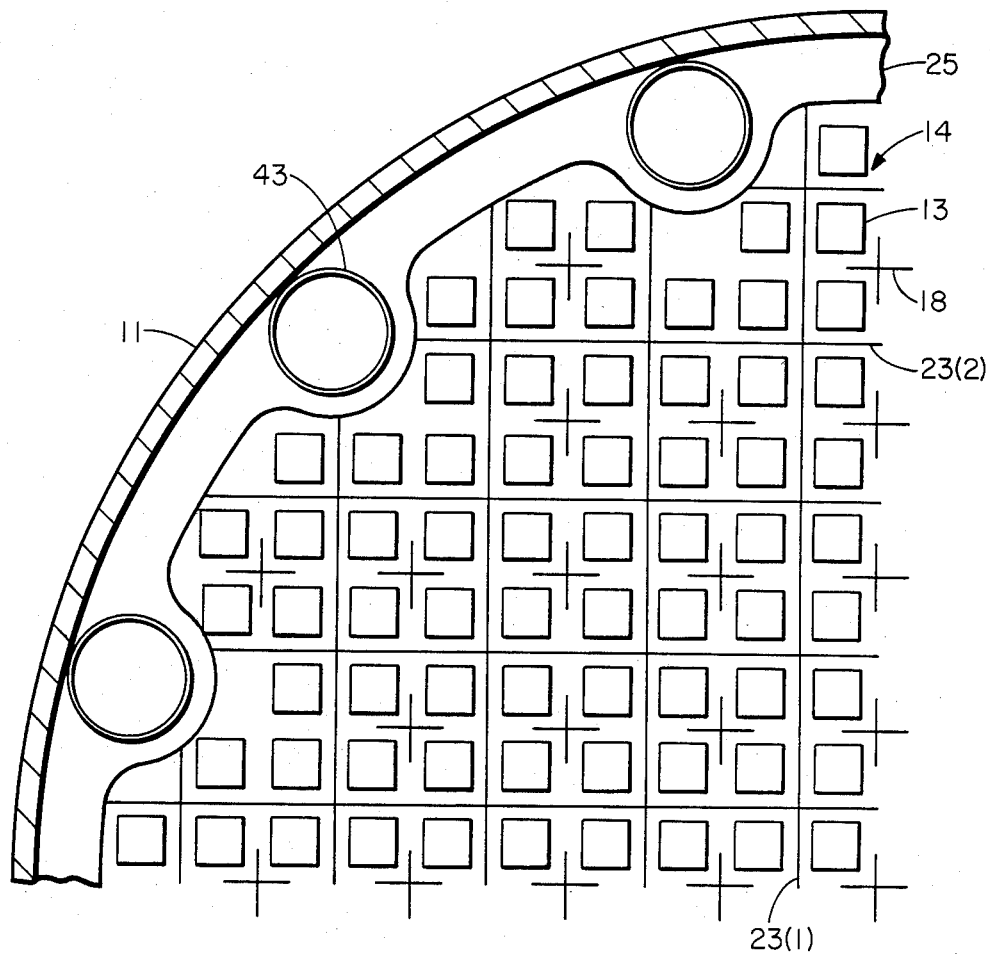

FIGS. 1A and 1B comprise a schematic illustration of a nuclear reactor steam supply system;

FIG. 2 is a partly cut away isometric view of a lower portion of a reactor pressure vessel; and FIG. 3 is a plan view of a portion of a nuclear fuel core in a reactor pressure vessel.

DESCRIPTION

The invention is described herein as used in a water cooled and moderated nuclear reactor of the boiling water type, an example of which is illustrated in simplified vertical cross section form in FIGS. 1A and 1B (taken together) and in greater detail in FIG. 2.

Such a reactor system includes a pressure vessel 11 containing a nuclear reactor core 12 submerged in a coolant-moderator such as light water. The core 12 includes a plurality of replaceable fuel assemblies 13 arranged in spaced relation between an upper core grid 14 and a lower core plate 16. (A typical such fuel assembly is shown for example by Smith et al in U.S. Pat. No. 3,689,358).

A plurality of control rod drive housing tubes 17 penetrate the bottom of the pressure vessel 11 and house control rod drives (as shown for example by Hobson et al in U.S. Pat. No. 3,020,887) by which a plurality of control rods 18 are selectively insertable among the fuel assemblies 13 for control of the reactivity of the core.

The control rod drive housing tubes 17 support control rod guide tubes 19 which receive and house the control rods 18 when they are withdrawn from the core. The guide tubes 19, in turn, support fuel assembly support members 21 each of which is formed with sockets for receiving the nose pieces 22 (FIG. 2) of four adjacent fuel assemblies 13.

In typical prior reactor core arrangements, as discussed hereinbefore, the core is surrounded by a cylindrical shroud which serves as a support for the upper core grid and the lower core plate and provides a coolant downcomer for coolant recirculation flow.

In accordance with this invention, such a shroud is dispensed with. As best shown in FIG. 2, the upper core grid 14 may be formed by intersecting and interlocked beams 23(1) and 23(2) attached to a peripheral band 20 supported by an upper support ring 25. The upper support ring 25 rests upon and is removably attached (as by bolts not shown) to an upper support flange 26 secured to the wall of the pressure vessel 11. (The support ring 25 may be formed of a series of overlapping segments bolted together to facilitate installation and removal.) The lower core plate 16 is similarly supported by a lower band 24 and by a lower support ring 27, the latter being removably attached (as by bolts not shown) to a lower support flange 30 secured to the wall of the pressure vessel 11.

This core support arrangement provides several advantages. Loads on the core are transmitted directly to the walls of the pressure vessel 11 through the bands 20, 24, rings 25, 27 and flanges 26, 30. By transmitting these loads through the vertically oriented bands 20, 24, peak dynamic loads (e.g. seismic loads) are reduced. Also, this arrangement raises the attachment between ring 25 and flange 26 and lowers the attachment between ring 27 and flange 30 with respect to the nuclear core 12. This reduces the radiation to which these attachments are subjected and thus reduces the possibility of radiation induced weakening of these attachments.

Each control rod 18 and the surrounding four fuel assemblies 13, as shown in FIG. 2, comprise a fuel cell of the core 12, the four fuel assemblies 13 are laterally supported at their upper ends in an opening 28 in the upper core grid 14.

At their lower ends the four fuel assemblies are vertically supported on the fuel assembly support member 21 fitted to the top of the control rod guide tube 19, lateral support being provided by passage of the guide tube 19 through an aperture or hole 29 in the lower core plate 16. (At peripheral locations where a fuel cell has less than four fuel assemblies and no control rod, the assemblies are supported by special support members not shown, mounted on the core plate 16.

The lower core plate 16 and the lower portion of the pressure vessel 11 form a coolant supply chamber or lower plenum 31 wherein the coolant can be pressurized for recirculation through the core 12 as discussed hereinafter.

The pressurized water coolant from plenum 31 is admitted to the core 12 through openings 32 in the guide tubes 19 and passages in the support members 21 and the nose pieces 22 of the fuel assemblies 13. In its passage through the fuel assemblies 13 some of the water is converted to steam. The resulting steam-water mixture exiting the core 12 is directed by a core cover or dome 33 (FIG. 1A) through a plurality of steam separators 34 mounted thereon.

The separated water collects in a space around and above the dome 33 which constitutes an upper coolant supply chamber or upper plenum 36. The separated steam passes upward through a plurality of steam dryers 37 and is collected in a steam chamber 38 in the upper part of the pressure vessel 11. The steam may be taken from the vessel 11 for utilization by a device such as a turbine 39. Condensate formed in a condenser 41 may be returned to the vessel 11 by a pump 42 and added as feedwater to the coolant in upper plenum 36.

The function of the core shroud of prior reactor core arrangements in providing a coolant downcomer annulus for recirculation of coolant from the upper plenum 36 to the lower plenum 31 is replaced in accordance with this invention by a plurality of elongated, tubular, vertically oriented coolant conducting pipes or conduits 43 positioned in spaced relation around the core 12 close to the inner wall of the pressure vessel 11. The conduits 43 penetrate (and are supported by) the upper support ring 25 and the lower support ring 27 and thus provide a coolant flow path from the upper plenum 36 to the lower plenum 31. Additional support of the lower ends of conduits 43 can be provided by brackets, not shown, attached to the wall of the pressure vessel 11.)

Forced recirculation is provided by a plurality of coolant pressurizers such as pumps 44 each vertically mounted to the bottom of the pressure vessel 11 in alignment with a respective one of the coolant conducting conduits 43.

Pumps 44 may be, for example, similar to those shown in previously-mentioned U.S. Pat. No. 3,723,247 and include an electric motor 46 driving a shaft 47 to the upper end of which is detachably mounted an impeller 48 (FIG. 2) positioned in the lower open end of conduit 43. Alternatively, the shaft 47 and impeller 48 may be detachably mounted to the motor 46 for removal through conduit 43. (The term "conduit" as herein used includes the use of an integral section of pipe as illustrated herein or the use of a separate impeller housing connected to the lower end of a section of pipe.

Thus the pump inlet is to be considered the upper end of such impeller housing or the portion of the conduit 43 just above impeller 48 and the pump outlet is the bottom end of conduit 43. By this arrangement water is conducted from the upper plenum 36 through conduit 43 to the impeller 48 by which it is pressurized and delivered out the bottom open end of conduit 43 to the lower plenum 31.

Preferably the conduits 43 have an inside diameter throughout their length somewhat greater than the diameter of the impellers 48 whereby the conduits 43 conveniently can serve as guides for installation and removal of the impellers 48.

The major portion of the coolant recirculation flow is through the fuel assemblies 13. To avoid stagnation and to cool the control rods 18 and instrumentation devices (not shown) positioned between the fuel assemblies 13, a minor amount of coolant recirculation flow is provided between the fuel assemblies 13 and the conduits 43 by water through, for example, small passages or holes 49 (FIG. 1B) in the lower ends of the fuel assemblies 13.

The conduits 43 provide a convenient method of measuring the coolant recirculation flow rate. As shown in FIG. 1B, a pressure tap 51 can be provided in the wall of one or more of the conduits 43. The pressure at tap 51 is a function of the velocity of the coolant flow in the conduit 43 and hence a function of the coolant flow rate.

A second pressure tap 52 (FIG. 1A) in the region of the upper plenum 36 provides an indication of the static pressure in the vessel 11. The pressures at taps 51 and 52 are applied to a well-known differential pressure device 53 which can be calibrated in terms of coolant recirculation flow rate.

As compared to prior reactor core arrangements using a shroud around the core, the shroudless arrangement of this invention is simpler and less costly. It also has relatively greater structural strength, particularly resistance to seismic forces, the lateral loads at the top of the fuel assemblies 13 and of the core dome 33 and steam separators 34 being transferred to the vessel 11 at the upper support 26 rather than at the lower support 30.

Also, the shroudless arrangement of this invention allows a reduction in the diameter of the pressure vessel. For example, for a reactor with a power rating of 1300 Mwe constructed according to prior arrangements with a shroud around the core, the inside diameter of the pressure vessel is about 278 inches (706 cm). With use of the shroudless arrangement of the invention as illustrated in FIGS. 1A, 1B and 2, the inside diameter of the pressure vessel can be reduced to at least 273 inches (693 cm). While this reduction in diameter may seem small, it provides an overall plant cost saving estimated to be about $3,000,000.

The pressure vessel diameter may be further reduced by utilizing the space between the conduits 43 for fuel bundles 13 as illustrated in plan view in FIG. 3. This will necessitate appropriate shaping of the inner edge of the upper core support ring 25 and the outer edge of the upper core grid 14 as shown in FIG. 3.

In an example embodiment of the invention twelve conduits 43 equally spaced around the core 12 are used. Each conduit 43 is 25.5 ft (777 cm) long, 26.25 inches (67 cm) in inside diameter, has a wall thickness of 0.375 inches (1 cm) and is formed of stainless steel.

What is claimed is:

1. A system for forcing a liquid water coolant to recirculate through an unshrouded nuclear core in a pressure vessel, said core including an array of spaced fuel assemblies supported between a lower core support member and an upper core support member, each of said fuel assemblies being fitted with a tubular flow channel for containing water coolant flowing therethrough; an annular lower support ring attached to said pressure vessel and connected to said lower core support member for support thereof, said lower core support member, said lower support ring and the lower part of said pressure vessel forming a lower plenum wherein said coolant can be pressurized; an upper support ring attached to said pressure vessel and connected to said upper core support member, a space in said pressure vessel above said upper core support member forming an upper plenum for containing water coolant; a plurality of coolant pressurizers within said pressure vessel each having a coolant inlet and a coolant outlet; a plurality of vertically oriented elongated coolant conducting conduits positioned in radially spaced relation between said core and the inner wall of said pressure vessel and extending from the upper plenum to the lower plenum, each connected to the coolant inlet of a respective one of said coolant pressurizers and each penetrating said upper support ring for conducting coolant from said upper plenum to said coolant inlet, the coolant outlet of each coolant pressurizer being in fluid communication with said lower plenum for pressurizing the coolant therein; primary coolant passages through said lower support member for admitting pressurized coolant from said lower plenum into said fuel assemblies; and coolant outlet means at the upper end of said core for discharging liquid coolant from said core to said upper plenum whereby said coolant is recirculated from said lower plenum, through said core to said upper plenum and back to said lower plenum.

2. The system of claim 1 wherein said lower support ring is connected to said lower core support member by a downwardly extending cylindrical band adjoining the periphery of the lower core support member and said upper support ring is connected to s support ring is connected to said upper core support member by an upwardly extending peripheral band extending around said upper core support member whereby the effects of radiation from said core on the attachments of said upper and lower support rings to said pressure vessel is decreased.

3. The system of claim 1 further including a first pressure tap in at least one of said conduits, a second pressure tap positioned to sense the static pressure in said pressure vessel, and means connected to said first and second pressure taps and responsive to the difference in pressures thereat for indicating the rate of coolant flow through said one of said condutis.

4. The system of claim 1 including secondary coolant passages for admitting a minor portion of the pressurized coolant in said lower plenum into the spaces between said fuel assemblies and said conduits.

5. The system of claim 1 wherein said coolant pressurizer is a pump having an impeller within said pressure vessel in alignment with its respective coolant conducting conduit and having a diameter less than said coolant conducting conduit whereby said impeller can be removed and replaced through said coolant conducting conduit.

6. In a nuclear reactor including an unshrouded nuclear fuel core contained in a pressure vessel, said core including an array of spaced fuel assemblies supported between a lower core support member and an upper core support member, each of said fuel assemblies being contained in an individual tubular flow channel, a system for recirculating a liquid water coolant through said core comprising: a lower support ring secured to said pressure vessel and connected to said lower core support member for support thereof; a lower plenum in the lower portion of said pressure vessel wherein said coolant can be pressurized; fluid passages through said lower core support member for admitting pressurized coolant from said lower plenum to said fuel assemblies; an upper support ring attached to said pressure vessel and connected to said upper core support member; a space in said pressure vessel above said upper core support member forming an upper plenum for containing water coolant; a plurality of vertically oriented annularly arranged coolant pumps secured to the bottom portion of said pressure vessel, each pump including a driven shaft, a drive motor connected to the bottom end of said driven shaft and an impeller located within said pressure vessel and secured to the upper end of said driven shaft; a vertically oriented elongated open-ended coolant conducting conduit positioned in radially spaced relation between the core and the inner wall of the pressure vessel in axial alignment with each of said impellers, said conduit penetrating said upper and lower support rings and extending from the upper plenum to the lower plenum, the upper end of each said conduit being in fluid communication with said upper plenum, and the lower end of said conduit receiving said impeller and being in fluid communication with said lower plenum for receiving fluid through said conduit from said upper plenum and pressurizing the coolant in said lower plenum.

7. In the system of claim 6, a plurality of fluid passages through said lower core support member for admitting a minor amount of pressurized coolant from said lower plenum to the spaces between the coolant conducting conduits.

* * * * *